United States Patent

Wood

[15] 3,702,018

[45] Nov. 7, 1972

[54] HANGER ARRANGEMENT

[72] Inventor: Philip C. Wood, 1101 New Hampshire Avenue, Apt. 521, Washington, D.C. 20037

[22] Filed: Dec. 9, 1970

[21] Appl. No.: 96,494

[52] U.S. Cl. ..............................24/73 B, 280/47.34
[51] Int. Cl. ..............................A44b 21/00
[58] Field of Search............280/47.34, 47.17, 47.35; 224/42.46; 248/340; 24/73 B, 73 HH, 73 TH, 81 B, 81 C, 73 C, 84 B, 84 H

[56] References Cited

UNITED STATES PATENTS

| 338,833 | 3/1886 | Fahey | 224/42.46 R |
| 1,496,388 | 6/1924 | Stern | 24/84 B |
| 2,586,495 | 2/1952 | Woods | 280/47.35 |
| 2,775,804 | 1/1957 | Ayoub | 24/73 B |
| 3,321,213 | 5/1967 | Shoffner | 280/47.34 |

FOREIGN PATENTS OR APPLICATIONS 799,878  8/1958  Great Britain ............24/81 B

*Primary Examiner*—Donald A. Griffin
*Attorney*—Murphy and Dobyns

[57] ABSTRACT

An S-shaped hanger with a tongue adapted to fit on a standard four-wheel supermarket basket to hold a folding two-wheel shopping cart for carriage with the supermarket basket.

6 Claims, 7 Drawing Figures

PATENTED NOV 7 1972

INVENTOR
PHILIP C. WOOD

BY *Murphy and Dobyns*

ATTORNEYS

INVENTOR
PHILIP C. WOOD

BY *Murphy and Dobyns*

ATTORNEYS

HANGER ARRANGEMENT

BACKGROUND OF THE INVENTION

1. Field of the Invention

The invention relates to a hanger for attaching a two-wheel shopping cart to the front of a four-wheel supermarket basket.

2. Description of the Prior Art

Recently, folding two-wheel shopping carts have been increasing in popularity. These carts are customarily owned by the shopper, who takes one with him or her to the market. He places his bags of groceries in the cart after purchase and rolls the cart to some desired place, such as his home, thereby eliminating the need to carry the bags. However, there is a problem in handling the carts at the market while the shopping is being done. In many places, if the cart is left unguarded, whether inside or outside the supermarket building, there is a strong possibility that it will be stolen, misappropriated or vandalized. It is extremely awkward to push the supermarket basket around with one hand and pull the two-wheel shopping cart around with the other, shifting hands as necessary to choose items from the shelves.

If the shopper attempts to use the cart instead of a basket to hold the items as he chooses them, he is required to do much deep bending to place items in the bottom of the cart. The holes between the wires in a typical shopping cart are too large to hold many of the small items which the shopper would have to carry in it if he used it in place of a basket. The carts are intended for use in carrying bags of items rather than individual items.

The problem might be solved by attaching the cart to or placing it in the basket for carriage with the basket. The typical cart is far too large and bulky to be carried in a typical basket. Shoppers have been observed tying carts to baskets with pieces of twine. This method is obviously a makeshift and tedious solution to the problem.

SUMMARY OF THE INVENTION

The invention comprises a simple hanger which can be produced economically from a sheet of metal, a bent piece of wire, or other material. The hanger is hung on the supermarket basket, preferably on the front, to hold a folded shopping cart. The hanger is approximately S-shaped, and the top hook fits over the top of the four-wheel basket, preferably in the middle of the front wall. A tongue at the bottom of the hanger extends back between two of the vertical wire bars on the basket wall to prevent the hanger from sliding sideways. In one embodiment the lower hook of the S-shaped hanger is split by bending back material to create the tongue. The lower hook itself is formed in the opposite direction to receive one or more horizontal bars on the folded shopping cart, thereby hooking the cart in place at the front of the basket.

DESCRIPTION OF THE PREFERRED EMBODIMENT

Figure 1:
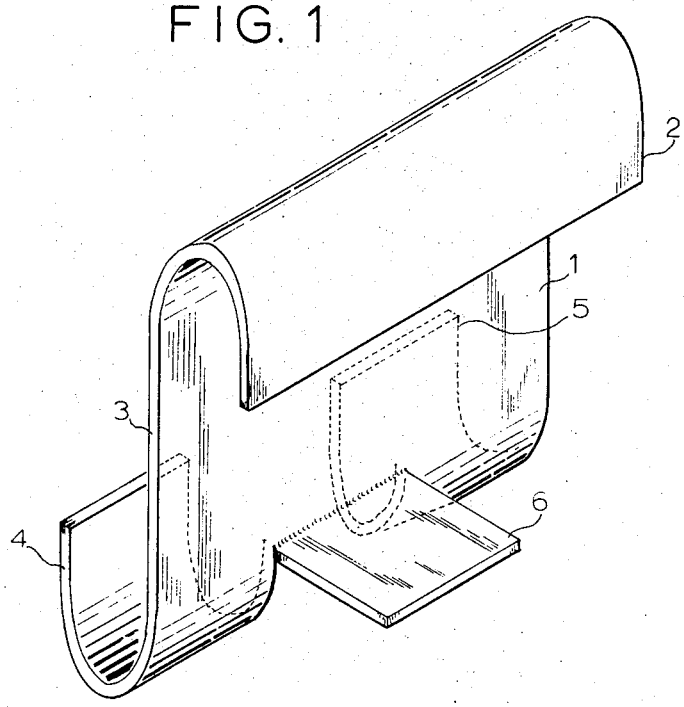
FIG. 1 is a perspective view of a sheet metal hanger of the present invention.

FIG. 1 is a perspective illustration of a sheet metal hanger 1 used in the present invention. Other sheet material could also be used. An upper hook 2 is provided and is adapted to be hooked over the upper front portion of a four-wheel supermarket basket. A substantially flat portion 3 connects the upper hook 2 with the first and second sections 4 and 5 of a lower hook and to a tongue 6. The tongue 6 extends substantially perpendicularly outward from the flat portion 3 in the same direction as the first hook 2. The sections of the lower hook 4 and 5 are respectively on either side of the tongue 6 and extend outward in the opposite direction. The lower hook 4 and 5 is adapted to hook one or more horizontal wires on a folded shopping cart to hold the cart in place.

Figure 2:
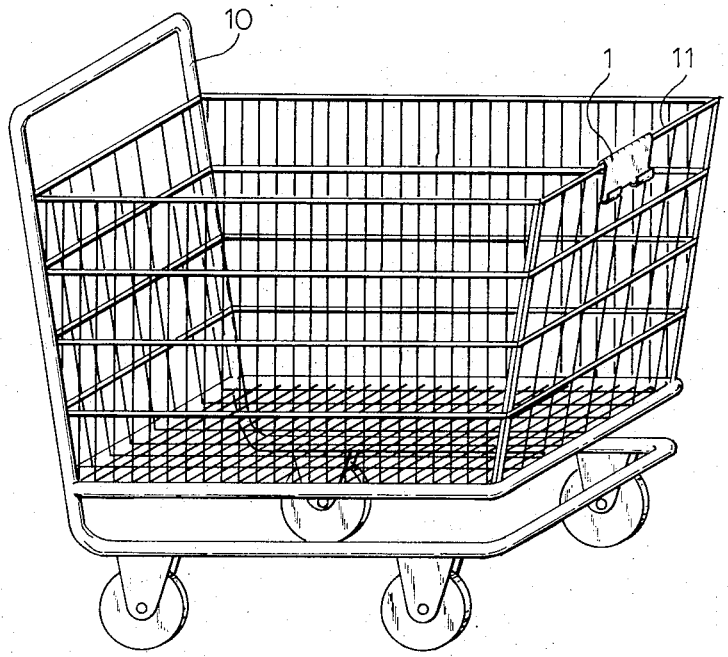
FIG. 2 is a perspective view of a four-wheel shopping basket having the hanger attached thereto.

FIG. 2 illustrates a four-wheel shopping basket 10 with a hanger 1 fitted over the top rung 11 in the middle thereof.

Figure 3:
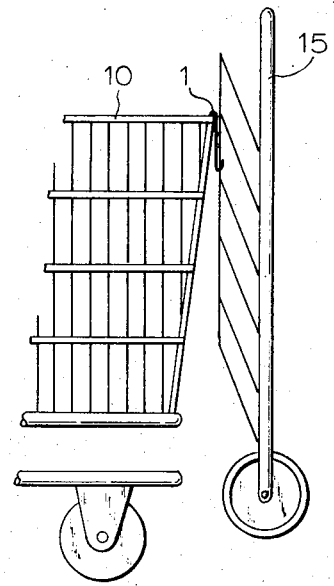
FIG. 3 is a partial side view of a basket as in FIG. 2 showing a two-wheel folding shopping cart hooked on the hanger.

FIG. 3 illustrates one manner in which a folded shopping cart 15 can be hooked by a hanger 1 attached to a basket 10, only part of which is shown. If the lower hook 4 and 5 is made wide enough, the cart can also be folded and hung in such a manner that the lower hook receives horizontal wires in both the front and back sections of the folded cart. However, it is not necessary to hook both sides of the cart to support it.

Figure 4:
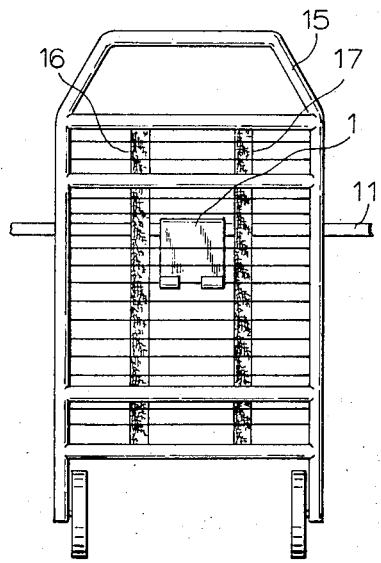
FIG. 4 is a view of a two-wheel shopping cart, showing how it is carried by the hanger.

FIG. 4 is another view of a folded shopping cart 15 on a hanger 1. Only the top rung 11 of the supermarket basket is illustrated in this figure.

While the hanger is not critical in its dimensions in one preferred embodiment it is made from a sheet of metal which is five inches wide. The flat section of the hanger is two and a half to three inches high. Each of the hooks 2, 4, and 5 extends back towards the opposite end a distance of about 1 inch. The tongue 6 is about one-half inch wide and one-half inch long. The typical shopping cart has two vertical fabric straps 16 and 17 about 6 inches apart, between which the lower hooks 4 and 5 fit. The typical shopping basket has vertical wires which are about one-half inch apart, between which the tongue 6 fits. Of course, dimensions can be adapted to suit other types of carts or baskets which might be developed or become popular.

The hanger may have one or more small holes to permit the hanger to be relatively permanently tied or fastened to the basket where the hanger is provided by the supermarket owner as a relatively permanent part of the basket.

In the embodiment shown in FIG. 1 the hanger can be printed with an advertising message, on the back side. Thus the advertising message is in the constant view of the shopper.

Figure 5:
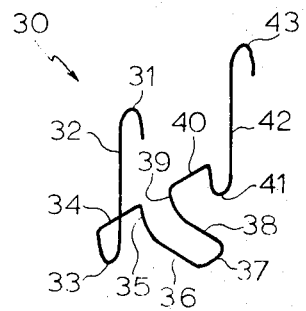
FIGS 5, 6, and 7 are views of other embodiments of the present invention wherein the hanger is formed of wire.
Figure 6:
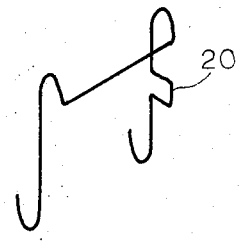
Figure 7:
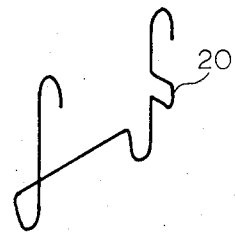

FIGS. 5, 6, and 7 illustrate alternative forms of the hanger constructed from bent wire. The device of FIG.

5 forms a wire outline of the sheet metal hanger of FIG. 1. The hangers of FIGS. 6 and 7 are also wire outlines with the stabilizing tongue 20 located to one side. This form of construction should be less expensive in large quantities than the sheet metal construction, but it would not necessarily last so long.

Referring now to FIG. 5 there is shown another preferred embodiment of the present invention wherein the hanger 30 comprises a continuous length of wire of discrete contiguous segments bent as shown. The hanger 30 has a first downwardly opening hook 31 adapted to fit over the top edge of one wall of the basket. The hook 31 is attached to a first vertically extending segment 32 which in turn is attached to a first upwardly opening hook 33. The hook 33 is contiguous to a first horizontally transversely extending segment 34. The segment 34 is attached to a downwardly extending segment 35 which in turn is attached to a first tongue leg 36. The leg 36 is attached to a bight 37 which in turn is attached to a second tongue leg 38. The leg 38 is attached to an upwardly extending segment 39 which in turn is attached to a second horizontally transversely extending segment 40. The segment 40 is attached to a second upwardly opening hook 41 which in turn is attached to a second vertically extending segment 42. The segment 42 is attached to a second downwardly opening hook 43. The downwardly opening hooks 31 and 43 are adapted to fit over the top edge of one wall of the supermarket basket. The upwardly opening hooks 33 and 41 are adapted to receive from the top a horizontal structural portion of the two-wheel folding shopping cart. The bight 37 is adapted to fit between vertical portions of the supermarket basket in order to limit the transverse movement of the hanger 30 in the same manner as the tongue 6 shown in FIG. 1.

The hanger 30 has an advantage over the hanger 1 in that the hanger 30 is less expensive to manufacture. The hanger 30 is preferred over the hanger shown in FIGS. 6 and 7 because the tongue 20 of each of these latter hangers is susceptible to being opened due to the weight of the shopping cart hanging in the lower upwardly opening hooks.

Although the invention has been described in considerable detail with reference to certain preferred embodiments thereof, it will be understood that variations and modifications can be effected within the spirit and scope of the invention as described above and as defined in the appended claims.

What is claimed is:

1. A hanger adapted to be fitted onto a four-wheel, four-walled supermarket basket to hook, hold and carry a two-wheel folding shopping cart, comprising:
  A. a substantially flat portion having two ends,
  B. an upper hook extending from one end of said flat portion and adapted to hook over the top portion of one wall of said basket,
  C. a tongue extending from the other end of said flat portion and adapted to fit through said wall, said tongue constituting means for preventing lateral movement between the hook and the basket, and
  D. a lower hook extending from said other end of said flat portion and adapted to hook through a folded shopping cart, said lower hook comprising a first section and a second section spaced from each constituting means for receiving and holding the cart in stable relationship, whereby the cart can be carried by the basket.

2. The hanger of claim 1 adapted to be fitted onto a four-wheel, four-walled supermarket basket to hold, hook and carry a two-wheel folding shopping cart, said hanger comprising a continuous length of wire of discrete contiguous segments bent so as to form:
  A. a first downwardly opening hook 31 adapted to fit over the top edge of one wall of said basket;
  B. a first vertically extending segment 32 contiguous to said first downwardly opening hook 31;
  C. a first upwardly opening hook 33 contiguous to said first vertically extending segment 32; and adapted to receive from the top a horizontal structural portion of said two-wheel folding shopping cart;
  D. a first horizontally transversely extending segment 34 contiguous to said first upwardly opening hook 33;
  E. a downwardly extending segment 35 contiguous to said first horizontally transversely extending segment 34;
  F. a first tongue leg 36 contiguous to said downwardly extending segment 35;
  G. a bight 37 contiguous to said first tongue leg 36 and adapted to fit between vertical portions of said supermarket basket in order to limit the transverse movement of said hanger;
  H. a second tongue leg 38 contiguous to said bight 37;
  I. an upwardly extending segment 39 contiguous to said second tongue leg 38;
  J. a second horizontally transversely extending segment 40 contiguous to said upwardly extending segment 38;
  K. a second upwardly opening hook 41 contiguous to said second horizontally transversely extending segment 40 and adapted to receive from the top a horizontal structural portion of said two-wheel folding shopping cart;
  L. a second vertically extending segment 42 contiguous to said second upwardly opening hook 41; and
  M. a second downwardly opening hook 43 contiguous to said second vertically extending segment 42 and adapted to fit over the top edge of one wall of said basket.

3. A shopping container system for use with a hanger according to claim 2 comprising, in combination:
  A. a four-wheel, four-walled supermarket basket,
  B. a two-wheel, folding shopping cart, and
  C. a hanger according to claim 3 for holding the cart in place against the basket.

4. A shopping container system for use with a hanger according to claim 2 comprising, in combination:
  A. a four-wheel, four-walled supermarket basket,
  B. a two-wheel, folding shopping cart, and
  C. a hanger according to claim 1 comprising:
    C1. an upper hook means for hooking over the top of one wall of the basket,
    C2. a tongue extending through said one wall of the basket for stability, and
    C3. a lower hook means for hooking through the cart when the cart is folded.

5. A shopping container system for use with a hanger according to claim 1 comprising, in combination:

A. a four-wheel, four-walled supermarket basket,
B. a two-wheel, folding shopping cart, and
C. a hanger according to claim 2 for holding the cart in place against the basket.

6. A hanger of claim 1 adapted to be fitted onto a four-wheel, four-walled supermarket basket to hook, hold and carry a two-wheel folding shopping cart comprising:
A. a substantially flat portion having two ends and,
B. an upper hook extending from one end of said flat portion and adapted to hook over the top portion of one wall of said basket,
C. a tongue extending from the other end of said flat portion and adapted to fit through one wall of the basket, said tongue extending beyond a plane defined by the rearmost portions of the hanger, such that the tongue will extend between the vertical wires of the basket when the upper hook is placed over the upper edge of one wall of the basket, said tongue constituting means for preventing lateral movement of the hanger with respect to the basket,
D. a lower hook extending from the other end of the flat portion adapted to hook through a folding shopping cart, said lower hook comprising a first section and a second section, said first and second sections being separated from each other a distance equal to the width of the tongue, said first and second sections constituting a pair of upwardly opening hook members spaced from one another a distance constituting means for receiving and holding in stable relationship a horizontal element of the folding shopping cart.

* * * * *

M&D 146

UNITED STATES PATENT OFFICE
CERTIFICATE OF CORRECTION

Patent No. 3,702,018          Dated November 7, 1972

Inventor(s) Philip C. Wood

It is certified that error appears in the above-identified patent and that said Letters Patent are hereby corrected as shown below:

Claim 3, Line 5, change "3" to read --2--.

Claim 4, Line 2, change "2" to read --1--.

Claim 5, Line 5, change "2" to read --1--.

Signed and sealed this 6th day of March 1973.

(SEAL)
Attest:

EDWARD M. FLETCHER, JR.           ROBERT GOTTSCHALK
Attesting Officer                 Commissioner of Patents